July 4, 1944.　　　　C. D. NUGENT　　　　2,352,732
PRESSURE FILTER
Filed April 3, 1942　　　　2 Sheets-Sheet 1
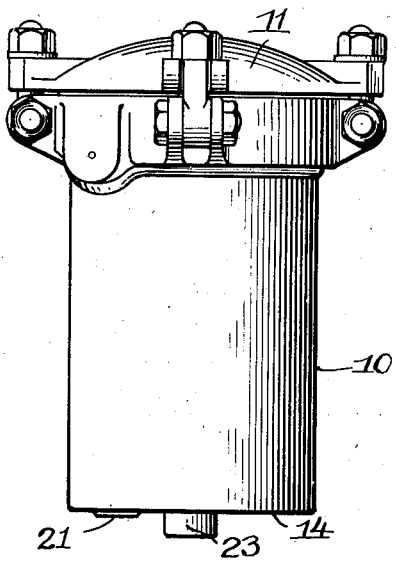
Fig.1
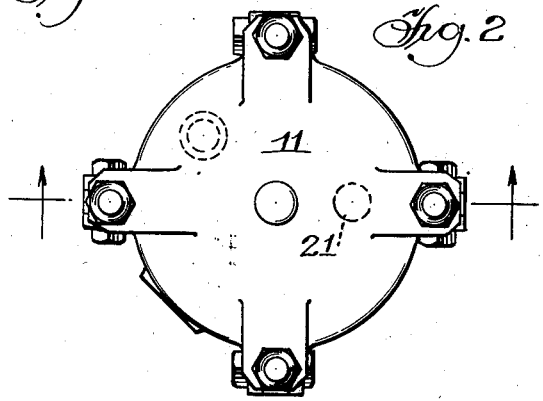
Fig.2
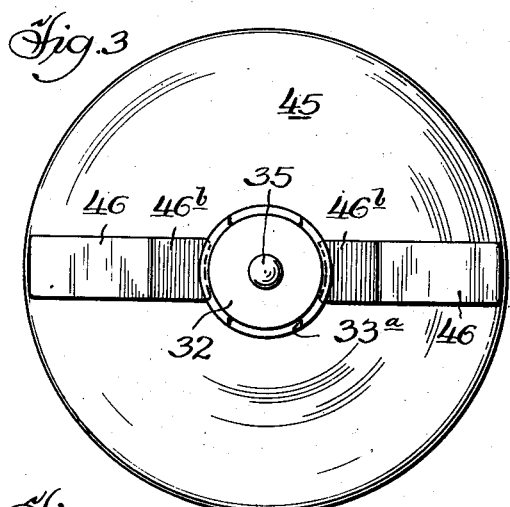
Fig.3
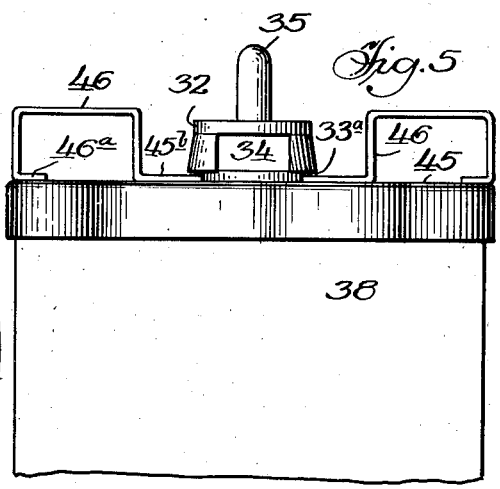
Fig.5
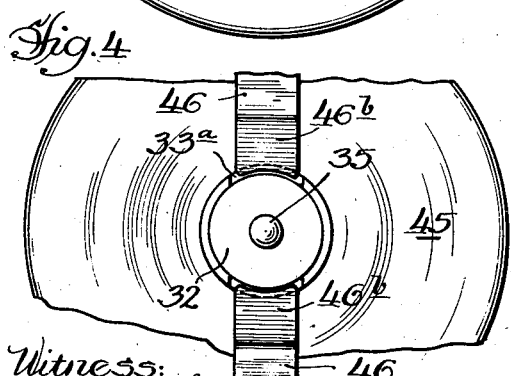
Fig.4
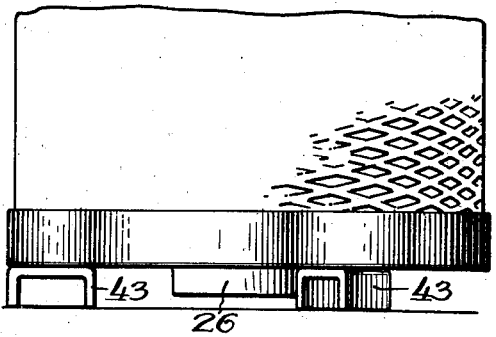
INVENTOR.
Corliss D. Nugent July 4, 1944.   C. D. NUGENT   2,352,732
PRESSURE FILTER
Filed April 3, 1942   2 Sheets-Sheet 2

Witness:
Chas. R. Kursh

INVENTOR.
Corliss D. Nugent,
BY Offield Mehlhope Scott & Poole
Attys.

Patented July 4, 1944

2,352,732

UNITED STATES PATENT OFFICE 2,352,732

PRESSURE FILTER

Corliss D. Nugent, Chicago, Ill.

Application April 3, 1942, Serial No. 437,493

4 Claims. (Cl. 210—131)

This invention relates to a pressure filter and consists of the matters hereinafter described and more particularly pointed out in the appended claims.

The filter is of that kind which includes a casing provided with inlet and outlet openings and a removable filter element through which the oil or other liquid is forced on a path from the inlet, thence radially through the filter element, thence out through the outlet opening. It also includes a spring-controlled by-pass valve which is normally closed but which is adapted to open in the direction of the outlet opening of the casing to by-pass the oil thereto when the pressure is increased above that normally intended, as occurs when the filter element has been clogged with the solid matter carried by the filter.

A filter of the kind and to which the improvement herein is applied, is shown in my prior Patent No. 2,212,647.

The object of the present invention is to provide in such a filter a filtering element or filter cartridge embodying improvements by reason of which it may be removed from the casing without the necessity of grasping its dirty, slippery sides.

Another object of the invention is to provide such a cartridge with simple and efficient means by which the cartridge may be securely locked within the casing.

Another object of the invention is to provide such a cartridge constructed in such manner with reference to the casing that when the waste in the cartridge settles under the vibration of the engine or other machine to which the filter is attached, there will be no danger of by-passing of the dirty oil without being filtered through the waste.

These and other objects and advantages of the invention will appear more fully as I proceed with my specification.

In the drawings:

Figure 1 is a side elevation of the improved pressure filter.

Figure 2 is a top plan view of the same.

Figure 3 is a top plan view of the cartridge as it appears when locked to the apertured plug which provides the seat for the ball by-pass valve element.

Figure 4 is a like view partially broken away, showing the cap in the position it occupies when unlocked from said plug.

Figure 5 is a side elevation showing the cartridge as it appears when removed from the casing and set on the floor or other support for the purpose of being re-packed with waste.

Figure 6:
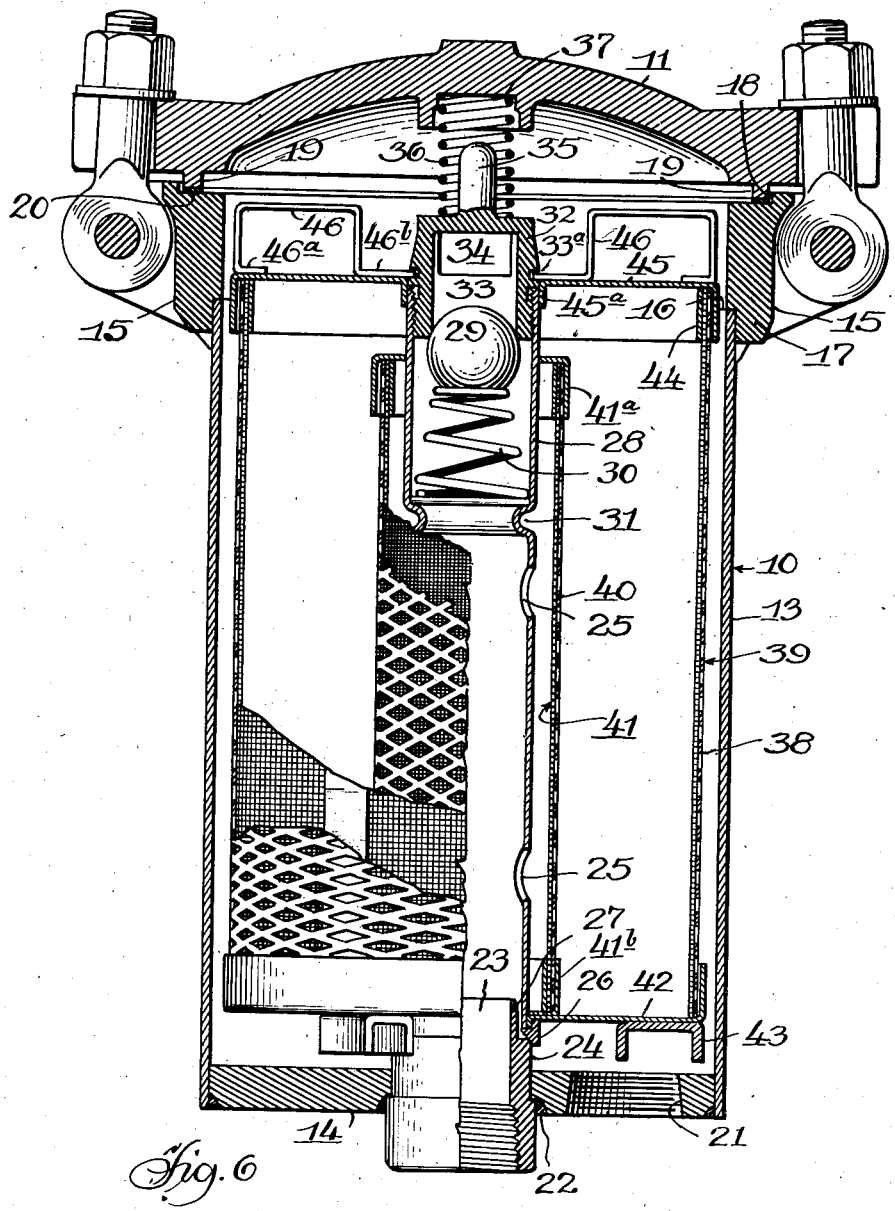
Figure 6 is a view representing a vertical central section through the pressure filter on an enlarged scale, with the filter cartridge locked therein ready for use.

Referring now to that embodiment of the invention illustrated in the drawings: 10 indicates the filter casing, and 11 indicates a cover removably secured thereto. The casing consists of a cylindrical shell 13 having rigidly secured within it a bottom wall 14 of heavier material. A flanged ring 15 embraces the top end of the shell 13 with the upper end thereof abutting an annular shoulder 16 spaced above the bottom edge of the flange 17 of the ring. The top of the ring 15 is provided with an annular inwardly facing shoulder 18 within which is engaged a depending annular rib 19 of the cover 11, a gasket 20 being interposed between the top of the ring 15 and the bottom end of the rib 19.

The bottom wall 14 is provided with a threaded inlet opening 21 at one side and with a central outlet opening 22 in which is seated and fixed a threaded thimble 23. The thimble 23 has an upwardly projecting nipple 24 which extends above the top wall 14. 25 indicates a vertically disposed apertured tube having a flared bottom end 26 which rests upon an annular shoulder formed near the top of the nipple 24. Said nipple has a centering vertical extension 27 which projects within the bottom end of the tube 25 and above its flared end 26.

The tube 25 is formed near its top to provide a valve fitting 28 and containing a ball by-pass valve element 29 and a coil spring 30 which reacts between said ball and an annular inturned shoulder 31 formed in said tube. The upper end of the fitting 28 is threaded to receive the threaded end of an apertured plug 32 which provides a seat for the ball valve 29. Said plug has a vertical bore 33, and above the fitting 28 has a horizontal transverse bore 34 which intersects the vertical bore 33. The plug 32 has an upwardly projecting pin 35 which centers an expanding coiled spring 36 engaged at its upper end in a recess 37 formed on the under side and at the center of the cover 11, and at its other end is engaged against the top of the plug 32. When the cover 11 is closed, it provides a yielding pressure against the tube 25 to hold the flared bottom end 26 of said tube in engagement with the rounded top of the nipple 24, thus securely closing said tube on said nipple.

38 indicates as a whole a filter cartridge which contains the cotton waste or other filter material through which the liquid to be filtered is designed to be passed. Said element comprises an outer cylindrical, apertured shell 39 of somewhat smaller diameter than the diameter of the casing 10, and an inner cylindrical, apertured shell 40 of somewhat larger diameter than the tube 25 which is located centrally within it. Both the inner and outer shells are made of expanded metal with elongated apertures as shown in Figure 6. A fine mesh wire gauze cylinder 41 is fixed to the inner face of the inner shell 40 (see Figure 6). The cartridge 38 is closed at the bottom by an apertured flanged disc 42 fixed in any convenient manner, as by spot welding, by its flange to the outer shell 39 and closed at its aperture against the tube 25, above its flared bottom end 26.

The inner shell 40 with the fine mesh wire cylinder 41 is provided with top and bottom flanged spacing rings 41ª and 41ᵇ concentric with the tube 25. In this case said shell has been shortened about an inch or two, as shown in Figure 6, depending upon the size of the filter, so that its top edge is spaced below the top of the outer shell 39. Thus when the waste settles, due to vibration of the engine or machine to which the filter is attached, there is no way for the dirty oil to by-pass from the cartridge without being filtered through the waste, as was possible in the construction shown and claimed in my patent hereinabove referred to. Since the ring 41ª is closed against the tube 25, no by-passing of the oil is possible except after it has descended below the bottom edge of said ring.

Moreover, it will be noted that the ring 41ª on the upper end of shell 40 has a flat surface against which the waste can be packed when the cartridge is initially filled so as to prevent the waste from settling downwardly adjacent the tube 25 to a dangerous level.

Placed at equal arcuate distances about the bottom wall 42 of the filter cartridge are inverted U-shaped lugs 43, there being three of such lugs in this case. Said lugs constitute legs and depend below the bottom wall of the cartridge 42 a distance somewhat less than the distance between the bottom wall of the cartridge and the bottom wall 14 of the casing 10, but below the flared bottom end 26 of the tube 25.

The outer shell 39 of the cartridge is held in proper shape at the top by a metal band 44. It is closed by a removable flanged disc or cap 45. Said disc is apertured at the center and is provided with a depending flange 45ª to closely engage the plug 32 and the top of the tube 25.

46, 46 indicate handle bars disposed diametrically upon and fixed to the cover 45. As shown, these bars are in the form of inverted U-bars. Each is provided with flanges 46ª and 46ᵇ extending in the direction of the apertured center of the cover, the first one, 46ª, being secured to the peripheral margin of the cover, and the other one, 46ᵇ, being fixed to the cover and extending towards the central aperture in said cover beyond the flange 45ª thereof. The inner end of the flange 46ᵇ is adapted for engagement within a peripheral groove 33ª of the lug 33, said flange end being curved to engage the circular bottom of said groove. In line with the vertical edges of the port or passageway 34, said groove is cut away as shown in Figures 3 and 4. Thus in one position the flanges 46ᵇ, by engagement in the groove 33ª, will hold the cover in locked position on the top of the cartridge as shown in Figure 3. In the position with the handle bars at right angles to that shown in Figure 3, as illustrated in Figure 4, the ends of said flanges pass beyond said groove, and being thus disengaged therefrom, the cover or cap may be lifted from the cartridge by means of the handle bars 46. This construction provides not only a simple means for securely locking the cap on the cartridge, but also means for lifting the cartridge out of the casing 11 without soiling the hands with the oil on the outer surface of the cartridge 38.

Any loose waste threads that may be caught around the periphery of the tube 25 at the top will be cleared by the central depending flange 45ª of the cover which in the withdrawal of the cap cleans out the locking groove 33ª in the plug 32.

When the cartridge is removed from the casing 10, it may be set upon the floor, as in the case of my prior patent, to rest on the legs 43 which support the bottom of the cartridge with the flared end of the tube 25 above the floor. The legs in this case, however, being made in the form described are much stronger and provide a better support for the cartridge while being repacked with waste and preventing the center portion from being sprung due to heavy pounding of the waste into place. Thus the waste may be packed much tighter with improvement in the quality of filtering. These stronger feet also prevent the flared bottom end 26 of the tube 25 from being damaged by engagement with a rough concrete or other floor.

The operation of the pressure filter and its method of use is the same, except as herein pointed out, as that of the filter described in my patent hereinbefore referred to.

I claim as my invention:

1. A filter cartridge, for use in a pressure filter, comprising an outer apertured shell having a fixed bottom wall, a centrally disposed apertured tube depending through and fixed to said bottom wall, said tube having a flared bottom end, an inner apertured shell concentric with said tube and slidably fitting thereon, by-pass valve mechanism secured to the upper end of said tube, a cap enclosing the top of said cartridge, a plug threaded into said apertured tube and being provided with a vertical passageway and a transverse passage above said cap, inverted U-shaped handle bars fixed to the top of and disposed diametrically of said cap, said plug being provided with an annular groove above said cap, said groove terminating at the vertical lateral edges of said transverse passageway, and means providing tongues fixed to said cap adapted to engage in the groove in said plug.

2. A filter cartridge, for use in a pressure filter, comprising an outer apertured shell having a fixed bottom wall, a centrally disposed apertured tube depending through and fixed to said bottom wall, said tube having a flared bottom end, an inner apertured shell concentric with said tube and slidably fitting thereon, by-pass valve mechanism secured to the upper end of said tube, a cap enclosing the top of said cartridge, a plug threaded into said apertured tube and being provided with a vertical passageway and a transverse passage above said cap, inverted U-shaped handle bars fixed to the top of and disposed diametrically of said cap, said plug being provided with an annular groove above said cap, said groove terminating at the vertical lateral edges of said transverse passageway, said handle bars having flanges extending toward said plug and being provided at their ends with arcuate tongues engageable with said groove in said plug.

3. A filter cartridge, for use in a pressure filter, comprising an outer apertured shell having a fixed bottom wall, a centrally disposed apertured tube depending through and fixed to said bottom wall, said tube having a flared bottom end, an inner apertured shell concentric with said tube and slidably fitting thereon, by-pass valve mechanism secured to the upper end of said tube, a cap enclosing the top of said cartridge, a plug threaded into said apertured tube provided with a vertical passageway and a transverse passage and adapted to extend upwardly through said cap, said plug being provided with an annular groove above said cap, said groove terminating at the vertical lateral edges of said transverse passageway, and bars fixed on said cap having flanges extending toward said plug and being provided at their ends with arcuate tongues engageable with said groove in said plug, said flanges being adapted to clear any waste projecting upwardly from around the joint between said cap and said plug by rotation of said flanges about said plug.

4. A filter cartridge for use in a pressure filter, comprising an outer apertured shell having a fixed bottom wall, a centrally disposed apertured tube depending through and fixed to said bottom wall, said tube having a flared bottom end, an inner apertured shell concentric with said tube and fitting thereon, a cap enclosing the top of said cartridge, said tube being formed with a reduced portion intermediate its ends, by-pass valve mechanism in said tube comprising a plug threaded directly in the top of said tube and extending upwardly through said cap, said plug being provided with a passageway therethrough opening above said cap, a valve closure member in said tube, and a coil spring seated on said reduced portion in said tube and normally urging said valve closure member into engagement with the lower end of said plug to close said passageway.

CORLISS D. NUGENT.